June 16, 1925.

L. M. BRUHN 1,542,031

EDUCATIONAL DEVICE

Filed Feb. 2, 1924

INVENTOR

Lucy M Bruhn

BY Chapin & Neal

ATTORNEYS

June 16, 1925.

L. M. BRUHN 1,542,031

EDUCATIONAL DEVICE

Filed Feb. 2, 1924

Key to Sentences
8-12-2-5        8-17-22
8-12-2-7-5      11-17-22   Red
11-12-2-3
11-12-2-7-3
11-12-2-4
11-12-2-7-4
1-2-13
1-2-7-13

INVENTOR

Lucy M. Bruhn

BY Chapin & Neal

ATTORNEYS

Patented June 16, 1925.

1,542,031

UNITED STATES PATENT OFFICE.

LUCY M. BRUHN, OF JAMAICA PLAIN, MASSACHUSETTS, ASSIGNOR TO MILTON BRADLEY COMPANY, A CORPORATION OF MASSACHUSETTS.

EDUCATIONAL DEVICE.

Application filed February 2, 1924. Serial No. 690,172.

*To all whom it may concern:*

Be it known that LUCY M. BRUHN, a citizen of the United States, residing at Jamaica Plain, Boston, in the county of Suffolk and State of Massachusetts, have invented new and useful Improvements in Educational Devices, of which the following is a specification.

This invention relates to an amusement and an educational device. The invention is carried out by means of a series of blocks by which a particular predetermined scheme of forming sentences can be accomplished. It is especially adapted to amuse and at the same time instruct children in building up and reading simple sentences.

The principal object of the invention is to permit the child to play with building blocks for the purpose of building simple sentences so that it is more fully taught sentence structure without recognizing it as work. Another object is to provide kindergarten or primary grade school material for the self activity of the child.

With these and other objects in view, the invention is embodied in the means coordinated with common building blocks in the manner and form illustrated and described.

Figure 1:
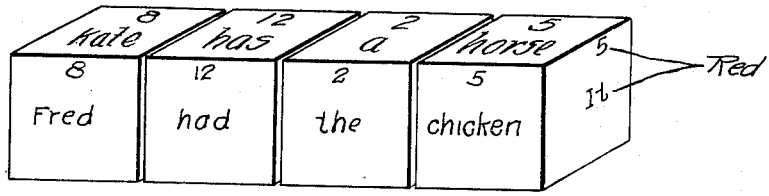
Fig. 1 represents a perspective view of a series of blocks taken from a set and arranged to carry out the invention.
Figure 2:
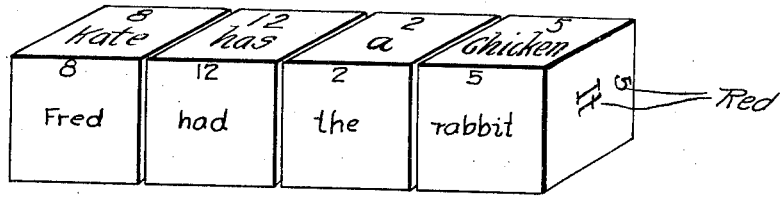
Fig. 2 is a view of the same series of blocks but with one block turned or rotated to a different position.
Figure 3:
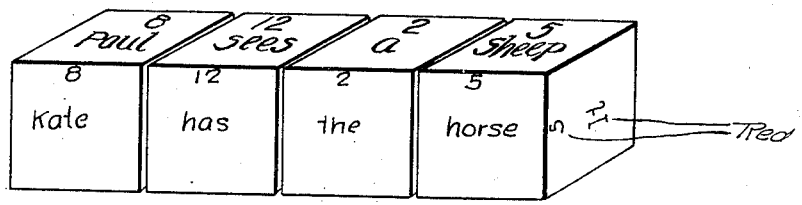
Fig. 3 is another view of the same blocks with the sides of three other blocks turned or rotated to different positions.

It will be understood that the blocks illustrated are a few only of a set of blocks used to carry out the invention. With a set, many different combinations may be made with different series of the blocks and I will now describe the use of the series of blocks illustrated which will be the same as with any other designated series.

It will be observed that each block carries a distinctive number on each side which fits into a certain series of numbers on the "key to sentences." A child is given or allowed to pick out blocks corresponding to one series of the number combinations shown on the key and then the blocks are arranged according to the order of the numbers in the particular series. A simple sentence is thus formed of the words which are printed on the sides as is illustrated in the drawings. The words are selected for the different sides around one axis of each block so that no matter what side is upturned in rotating the block on said axis, a completed sentence is formed if the order of the blocks is kept intact. It is thus apparent that as any block is rotated on its proper axis in place, a great variety of sentences appear with different words in each sentence. A child is thus instructed in the building up of sentences using different sets of words for different sentences while at the same time there is the play feature which holds the child's interest in the instruction. The child is particularly attracted by the fact that upon the rotation of any one block or all of the series, new sentences are formed which gives an element of surprise to its play.

I have confined this feature to rotating the blocks around the axis through their ends in order that the words will appear right side up in the sentence and it is obvious that it is necessary to use only the four sides of a block around a common axis, in contrast to the ends, for exhibiting the words in this manner. The words and numbers on these four sides are all printed in the same color, preferably in black, and the series of numbers in the "key to sentences" will be correspondingly printed in black. It will be therefore understood that with a given series of black numbers in the "key" all the corresponding blocks can be rotated around an axis through their ends and the words will appear right side up in the sentence.

Figure 4:
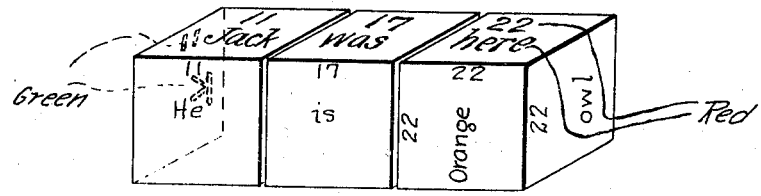
Fig. 4 is a perspective view of another series taken from the set showing a different arrangement of the blocks in carrying out the invention.
Figure 5:
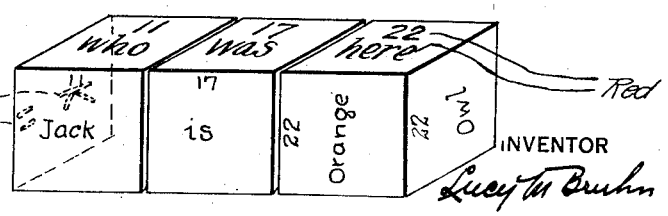
Fig. 5 is a view of the blocks in Fig. 4 with certain of the blocks rotated to a different position.
Figures 6, 7:
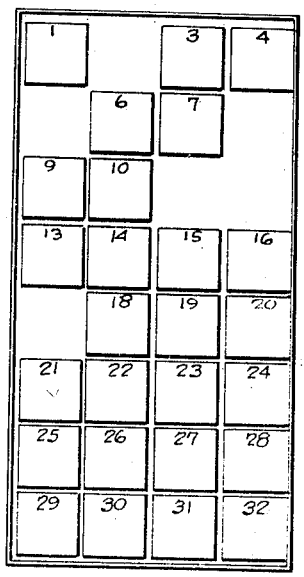
Fig. 6 is a portion of the "key to sentences" which accompanies each set of blocks.
Fig. 7 is a plan view of the remaining blocks in the set arranged in a box.

For the purpose of utilizing the end faces of the blocks but in such a way as to prevent words appearing in the sentence wrong side up and also to provide additional combinations and to add a further element of novelty in the use of the blocks, the end faces may have printed thereon words and the distinctive block number in different colors, such as red word and number on one end and a green word and number on the other end. The words for these end faces are not selected so that they will fit in and make sense in a sentence formed by a series of black numbers, and therefore in the "key to sentences" whenever a sentence is to be formed having an end face word appearing therein, a colored number will appear in the series of numbers in the "key" corresponding to the particular color and number on the end face of the block to be used in making up the sentence. It will be understood that a colored number in a series of numbers calls for the end face of the block having the particular colored word thereon and that particular block is not to be rotated. Such an arrangement of a series of blocks is shown in Figs. 4 and 5 and in Fig. 6 in the "key to sentences" a series of numbers appears in which there is a colored number corresponding to the colored word appearing on the end of the block in the sentence. In my present embodiment I have used one of the end faces for exhibiting a word printed in red while on the other end I have placed a letter of the alphabet in green, although the latter face may have a word and number printed in green thereon.

This additional element lends variety in the manipulation of the blocks according to the series of numbers given in the key. This feature also makes the game more attractive because the child using it by manipulating the blocks learns progressively and finds renewed interest in making less obvious combinations.

It is clear from the description that with a large set of blocks two or more children can play together and make up contests based on the speed with which a given number or kind of sentences can be built up.

The invention has the merit of simplicity as well as the advantage of the great multiplicity of things which can be done by the child with such simple means.

What I claim is:—

1. An educational device comprising a plurality of blocks, each block having an incompleted sentence or vocabulary unit and an index designation exhibited on one or more of its sides, said index designation being different for each block but the same on the various sides of each separate block, said blocks adapted to be differently arranged side by side according to predetermined combinations of said index designations whereby said vocabulary units form different completed sentences.

2. An educational device comprising a series of blocks, each block having a plurality of vocabulary units and an index designation on its sides, said index designation being different for each block but the same on the various sides of each separate block, said blocks adapted to be differently arranged according to predetermined combinations of said index designations whereby said vocabulary units form different completed sentences.

3. An educational device comprising a series of cubical blocks, each block having a different vocabulary unit and an index designation exhibited on each of its sides parallel to an axis through its ends, said index designation being different for each block but the same on the various sides of each separate block, said blocks adapted to be differently arranged end to end in a predetermined order of the said index designations, and to be rotated about said axis whereby said different vocabulary units of one block will make different completed sentences with the different vocabulary units of each other of the blocks.

4. An educational device comprising a series of cubical blocks, each block having a different vocabulary unit and an index designation, exhibited on each of its sides parallel to an axis through its ends, said index designation being different for each block but the same on the various sides of each separate block, said blocks adapted to be differently arranged end to end in a predetermined order of said index designations and to be rotated about said axis whereby said different vocabulary units of one block will make different completed sentences with the different vocabulary units of each other of the blocks, and vocabulary units and index designations of a character contrasting with that of said first named units and designations exhibited on one or both of said ends whereby further combinations of vocabulary units to give completed sentences may be obtained according to a predetermined order of both of said index designations.

5. The combination with a series of blocks, each having a vocabulary unit exhibited on one or more of its sides, of a distinctive number for each block, said number exhibited with each vocabulary unit whereby said blocks are arranged side by side according to predetermined combinations of said numbers to form different completed sentences of said vocabulary units.

6. The combination with a series of cubical blocks, each having a vocabulary unit exhibited on each of its sides parallel to an axis through its ends, of a distinctive number for each block on said sides whereby said blocks are arranged end to end according to predetermined combinations of said numbers to form a completed sentence of the vocabulary units on the upturned faces of said blocks, said blocks adapted to be rotated about said axis to form different completed sentences of the other vocabulary units.

In testimony whereof I have affixed my signature.

LUCY M. BRUHN.